March 30, 1926.  1,578,302
M. WALTER
CHASSIS CONSTRUCTION FOR MOTOR VEHICLES
Filed June 21, 1923   2 Sheets-Sheet 1
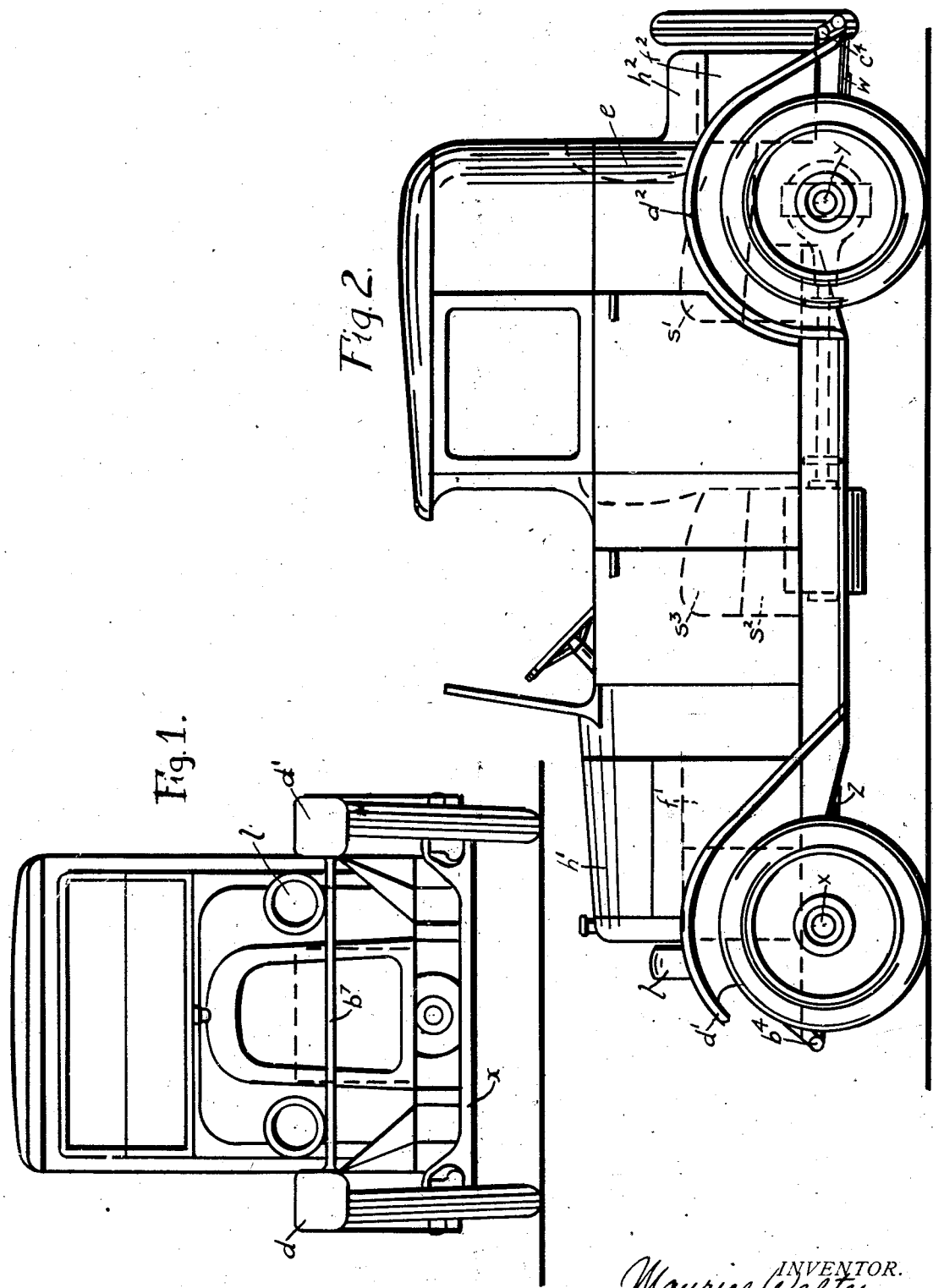

March 30, 1926.
M. WALTER
1,578,302
CHASSIS CONSTRUCTION FOR MOTOR VEHICLES
Filed June 21, 1923     2 Sheets-Sheet 2
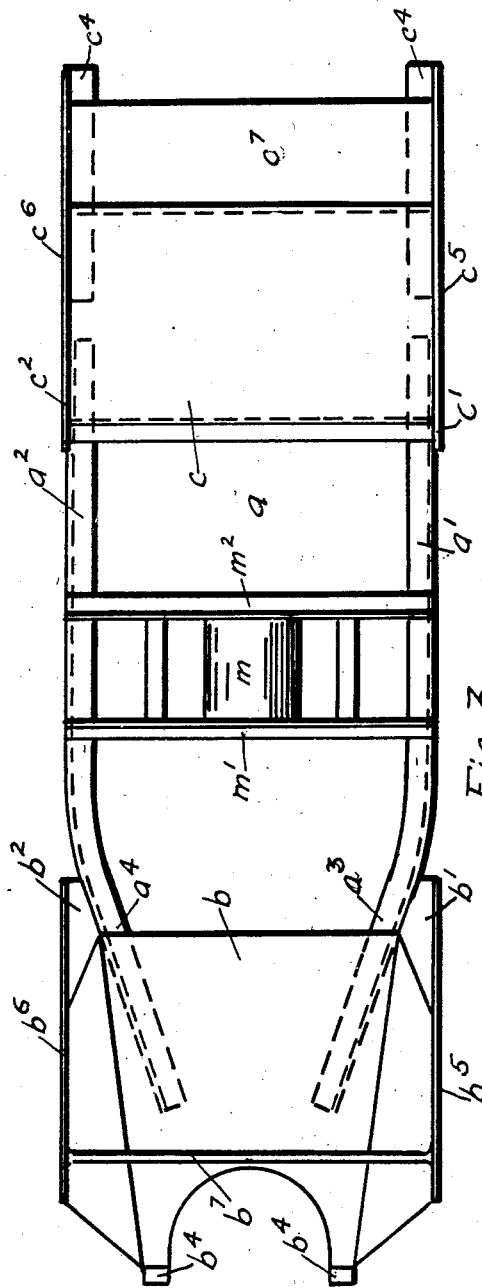
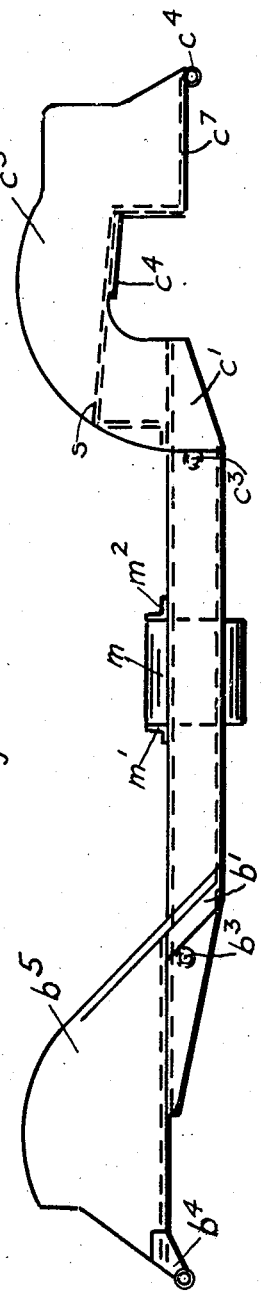
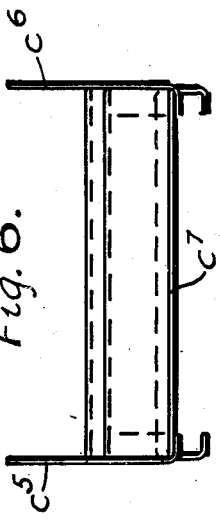
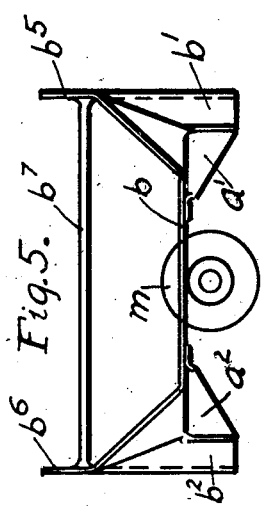
INVENTOR.
Maurice Walter
BY
Redding, Greeley, O'Shea & Campbell
ATTORNEYS.

Patented Mar. 30, 1926.

1,578,302

UNITED STATES PATENT OFFICE.

MAURICE WALTER, OF NEW YORK, N. Y.

CHASSIS CONSTRUCTION FOR MOTOR VEHICLES.

Application filed June 21, 1923. Serial No. 646,736.

*To all whom it may concern:*

Be it known that I, MAURICE WALTER, a citizen of the United States, residing in the borough of Manhattan, of the city of New York, in the State of New York, have invented certain new and useful Improvements in Chassis Construction for Motor Vehicles, of which the following is a specification, reference being had to the accompanying drawings, forming a part hereof.

This invention relates to improvements in chassis construction for motor vehicles and particularly for motor vehicles of the storage battery type.

Electrically propelled vehicles have not been widely used up to now and one of the reasons for their lack of popularity has been the excessive manufacturing and upkeep costs of such vehicles in comparison with their cruising radius. The strong and rugged chassis heretofore found necessary to support the extremely heavy storage batteries have involved a high cost of manufacture. The weight of such a chassis together with the weight of the storage batteries have required so much power to propel the vehicle that very many miles could not be covered without recharging the batteries. The batteries have been supported at such a high point by the usual chassis construction that the center of gravity of the vehicle was quite elevated which gave rise to the side sway and other undesirable motions of the body. These motions together with the weight of the vehicle resulted in so much wear and tear on the vehicle as to make the cost of upkeep out of all proportion to the effectiveness of the vehicle.

The present invention seeks to provide a construction in which the weight of the storage batteries is so distributed and supported that a lighter chassis frame may be used and the center of gravity of the chassis and its load maintained at a relatively low point. It also seeks to provide a construction in which the various component members of the chassis frame may be caused to serve more than one purpose thereby eliminating various parts which now only add to the burden of the chassis frame without increasing its strength or rigidity and which may be readily assembled and disassembled for replacements and repairs. With such a construction an electrically propelled motor vehicle has become as effective as the usual gasoline driven vehicle with respect to its cruising radius, initial costs and costs of upkeep.

In accordance with the invention it is proposed to mount the supports for the storage batteries directly upon the usual springs thereby relieving other parts of the frame of excessive strains and enabling lighter parts to be used. The batteries may be divided and a part thereof supported over each axle, whereby a greater proportion of the weight is carried by the rear wheels which results in better traction, improved riding qualities and easier steering. The battery supports may be used as connectors for the side rails of the chassis and by extending them beyond the ends of the rails over the axles, relatively short side rails may be used which are of less length than the distance between the axles. The side rails may then be set down between the axles at substantially the level thereof which permits a disposition of the weight close to the ground. The various members of the frame may be stamped out of sheet metal and bolted or otherwise secured together. By the use of bolts or the like the chassis may be assembled under ordinary shop practice and repairs or replacements effected without taking down the entire chassis. By stamping the various component elements of the chassis out of sheet metal, each element may be formed to serve more than one purpose. For instance portions of the front and rear battery supports may serve to connect the side rails. Other portions thereof may be formed to provide supports for the fenders and to serve as fender skirts and splashers. The rear battery support is shaped to provide a clearance for the rear axle and this clearance may serve as a base for the rear seat and body panels. Supports for the motor serve not only as braces for the side rails at the mid portion thereof but also serve to support the base for the driver's seat.

Other objects and advantages of the invention will be apparent from the following description of a preferred embodiment thereof which is illustrated in the accompanying drawings and in which:

Fig. 1 is a view in front elevation of a motor vehicle embodying the invention and showing the relative positions of the front batteries and the frame.

Fig. 2 is a view in side elevation of the motor vehicle showing the positions of the front and rear storage batteries and the relation of the axles and body with respect to the frame.

Figs. 3 and 4 are views in plan and side elevation, respectively of the chassis frame showing the location of the various cross frame members and the motor with respect to the side frame members.

Fig. 5 is a view in elevation of the chassis frame looking from the left in Figs. 3 and 4 and showing the front cross member.

Fig. 6 is a similar view looking from the right in these figures and showing the rear cross member.

In Figs. 1 and 2 there is indicated a motor vehicle in its entirety in which the present invention is embodied, but it will be understood that only so much of the vehicle as comes within the purview of the invention will be described and that so far as that portion of the vehicle is concerned forming no part of the present invention any suitable standard construction may be employed to advantage.

The frame of the vehicle, generally indicated as $a$, includes relatively short side rails $a'$, $a^2$, preferably formed in channel section from sheet metal. These side rails extend only between the axles $x$, $y$ and at their forward ends converge as at $a^3$, $a^4$ for the purpose of permitting greater freedom of angular movement of the steering wheels. At the front of the frame and connecting the side rails is a cross member $b$, preferably also stamped out of sheet metal, as illustrated. This member is secured to the upper surface of the side rails and extends beyond their ends over the front axle $x$. On the cross member $b$ are formed portions $b'$ $b^2$ extending in a generally downward direction to provide additional seating surfaces for attachment of the side rails. The member $b$ is of substantial width, in the direction from front to rear, and serves as a support for storage batteries $f'$ which are shown as covered and protected by any convenient hood $h'$. Suitable brackets $b^3$, $b^4$ may be formed on or secured to the cross member to serve as conventional means of attachment for the usual front springs $z$ of the vehicle. The sides of the front cross member $b$ are bent upwardly as shown in Figs. 3 and 4 to form side portions or wings $b^5$, $b^6$. In the preferred embodiment of the invention these wings are shaped to conform to the configuration of the front fenders $d'$ which are riveted or otherwise secured thereto. If necessary, for additional strength, a brace $b^7$ may be secured to the wings $b^5$, $b^6$. This brace not only adds to the rigidity of the wings and front fenders but may also serve as a support for the head lights $l$.

Connecting the side rails $a'$ $a^2$ at the rear of the frame is the cross member $c$, preferably also stamped out of sheet metal as illustrated. It is connected to the upper surfaces of the side rails and extends beyond the ends thereof over the rear axle $y$. By the provision of these cross members, secured to the side rails in this manner, the side rails are enabled to be set down practically at the level of the axles to provide a very low chassis construction. This is accomplished in part by forming the rear cross member with an offset portion $c^4$ to provide a clearance for the rear axle. The cross member $c$ is also formed with portion $c'$ $c^2$, extending in a generally downward direction to provide additional seating surfaces for attachment of the side rails. Suitable brackets such as $c^3$ $c^4$ are also formed on or secured to the cross member to provide means of attachment for the rear springs $w$. It will be understood that these brackets may be disposed upon the cross members to conform to any desired spring suspension. The sides of cross member $c$ are also bent upwardly as shown in Figs. 4 and 6 to form side portions or wings $c^5$, $c^6$. It is preferred that these wings be shaped to conform to the configuration of the rear fenders $d^2$ which are riveted or otherwise secured thereto. By the provision of these wings $b^5$, $b^6$, $c^5$, $c^6$, to which the fenders are directly secured, the use of additional fender supports, splashes and fender skirts is avoided with the resultant saving in weight and simplification in construction and in repairs, while at the same time the interior of the chassis is protected from mud and water splashed up by the wheels. It has been found convenient to use the offset portion $c^4$ as a support for the base $s$ of the rear seat cushion $s^1$ and for the rear body panel $e$. To the rear of the offset portion the cross member may be extended to form a support $c^7$ for storage batteries $f^2$ which may be protected and covered in any convenient manner as by the hood $h^2$. The part $c^7$ may also serve as a support for a tire rack and tail light, not shown.

Intermediate the two end cross members there is secured to the side rails $a'$ $a^2$, cross members $m'$, $m^2$ also preferably of sheet metal formed as angle irons. The motor $m$ may be suspended from members $m'$, $m^2$, and they may also serve as a support for the base $s^2$ of the driver's seat cushion $s^3$.

The various members comprising the chassis may be secured together in any desired manner but in the preferred embodiment they are bolted together in order that they may be readily assembled and disassembled for the purpose of repairs. A ramef constructed according to the present invention lends itself readily to repairs since one or more parts may be replaced without disturbing any of the other parts of the chassis.

While there has been illustrated a preferred embodiment of the invention it will be understood that modifications may be made in the shape and relative positions of the various component members of the chassis without departing from the spirit and scope of the invention and that no limitation thereof is intended other than as set out in the appended claims.

What I claim is:

1. In motor vehicle frame construction, longitudinal side frame members, a storage battery support connecting the front ends of said side members, a storage battery support secured to the rear ends of said side members, and means secured to the supports for supporting the frame from the axles.

2. In motor vehicle frame construction, longitudinal side frame members, cross members secured to the side members at either end thereof to support storage batteries and intermediate cross members to support a motor and the driver's seat.

3. In motor vehicle frame construction, channel shaped side frame members, a pressed metal cross member connecting the front ends of said side members and extending beyond the ends thereof, a pressed metal cross member connecting the rear ends of said side members and extending beyond the ends thereof, said second mentioned cross member being shaped to provide a clearance for the rear axle, and means secured to said cross members for supporting the frame from the axles.

4. In motor vehicle frame construction, longitudinal side frame members, pressed metal cross members connecting the ends of said side member and formed with vertically disposed portions serving as fender skirts for the fenders.

5. In a motor vehicle, axles, longitudinal side frame members disposed between the axles, a pressed metal cross member connecting the front ends of said side members, means secured to said cross member for supporting the frame from the front axle, a pressed metal cross member connecting the read ends of the side members and extending beyond the ends thereof, said last mentioned cross member being shaped to provide a recess for the rear axle and serving as a base for the rear seat, and means secured to said cross member for supporting the frame from the rear axle.

This specification signed this 19th day of June A. D. 1923.

MAURICE WALTER.